US007137707B2

(12) United States Patent
Beardsley et al.

(10) Patent No.: US 7,137,707 B2
(45) Date of Patent: Nov. 21, 2006

(54) PROJECTOR-CAMERA SYSTEM WITH LASER POINTERS

(75) Inventors: Paul A. Beardsley, Boston, MA (US); Jeroen van Baar, Brookline, MA (US); Ramesh Raskar, Cambridge, MA (US)

(73) Assignee: Mitsubishi Electric Research Laboratories, Inc, Cambridge, MA (US)

( * ) Notice: Subject to any disclaimer, the term of this patent is extended or adjusted under 35 U.S.C. 154(b) by 180 days.

(21) Appl. No.: 10/883,224

(22) Filed: Jul. 1, 2004

(65) Prior Publication Data

US 2006/0001839 A1 Jan. 5, 2006

(51) Int. Cl.
*G03B 21/26* (2006.01)
*H04N 3/23* (2006.01)

(52) U.S. Cl. .......................... 353/69; 353/42; 348/746

(58) Field of Classification Search ................. 353/60, 353/70, 42, 121, 28, 7; 348/745–747, 135–142
See application file for complete search history.

(56) References Cited

U.S. PATENT DOCUMENTS

| | | | | |
|---|---|---|---|---|
| 6,554,431 | B1 * | 4/2003 | Binsted et al. | 353/28 |
| 6,704,000 | B1 * | 3/2004 | Carpenter | 345/158 |
| 2003/0189675 | A1 * | 10/2003 | Itaki | 348/745 |
| 2003/0210381 | A1 * | 11/2003 | Itaki | 353/70 |
| 2005/0012907 | A1 * | 1/2005 | Inoue | 353/70 |

OTHER PUBLICATIONS

Raskar et al., 2003. ilamps: geometrically aware and self-configuring projectors. *ACM Trans. Graph.* 22, 3, 809-818.

* cited by examiner

*Primary Examiner*—W. B. Perkey
*Assistant Examiner*—Andrew Sever
(74) *Attorney, Agent, or Firm*—Dirk Brinkman; Clifton D. Mueller; Gene V. VinoVur

(57) ABSTRACT

A rigidly-coupled projector-camera system is augmented with laser pointers. The projector-camera system and lasers can be used to determine homography between the projector and a display surface, so that a projection of any desired geometry can be made on the display surface.

3 Claims, 8 Drawing Sheets

100

100

PROJECTOR-CAMERA SYSTEM WITH LASER POINTERS

FIELD OF THE INVENTION

This invention relates generally to projectors, and more particularly to calibrating projectors with cameras and laser pointers.

BACKGROUND OF THE INVENTION

A projector with rigidly attached camera can be used as a handheld projection system, U.S. patent application Ser. No. 10/394,314 "Geometrically Aware Projector," filed by Raskar et al., on Mar. 21, 2003, U.S. patent application Ser. No. 10/012,930 "Method for Calibrating a Projector with a Camera," filed by Raskar et al. on Dec. 10, 2001, and U.S. patent application Ser. No. 10/394,315 "Projector as an input and output device," filed by Beardsley et al., on Mar. 21, 2003, all incorporated herein by reference, and Raskar et al., "iLamps: Geometrically aware self-configuring projectors, SIGGRAPH Proceedings, 2003.

As the projector projects an output image on a display surface, the camera acquires an input image of the output image. The input image can be used to determine a pose of the projector relative to the display surface. Then, the output image can be adapted to the display surface according to the pose of the projector. For example, it is possible to perform keystone correction.

However, those projector-camera arrangements require that the camera views the entire projected image to extract four vertices in the output image for calibration. More specifically, the camera must view four points projected from known location on the image plane of the projector, e.g., the four corners of the projected image.

This constrains the content of projected images. The projected images cannot have any dark area in the vicinity of the calibration vertices, for example, along the image boundary. The problem is even more difficult when projecting onto a textured surface, rather than a homogeneous surface.

This problem can be solved by also attaching four laser pointers to the projector. Now, the content of the output images do not need to be constrained. In addition, laser light is bright and has a predetermined color, so that the calibration vertices are relatively easy to detect with a camera.

This raises a new problem. Prior art calibration methods assume that the projector and the camera are 'pinhole' devices. However, the rays generated by the laser pointers do not necessarily originate at the focal point of the projector. Therefore, the arrangement with laser pointers cannot be treated as a pinhole projection.

Therefore, there is a need to calibrate a projector with laser pointers.

SUMMARY OF THE INVENTION

The invention augments a rigidly-coupled projector-camera system with laser pointers. The projector-camera system can be used to determine the pose of the projector relative to a display surface, so that a projection of any desired geometry can be made on the surface.

DETAILED DESCRIPTION OF THE PREFERRED EMBODIMENT

System Structure

Figure 1:
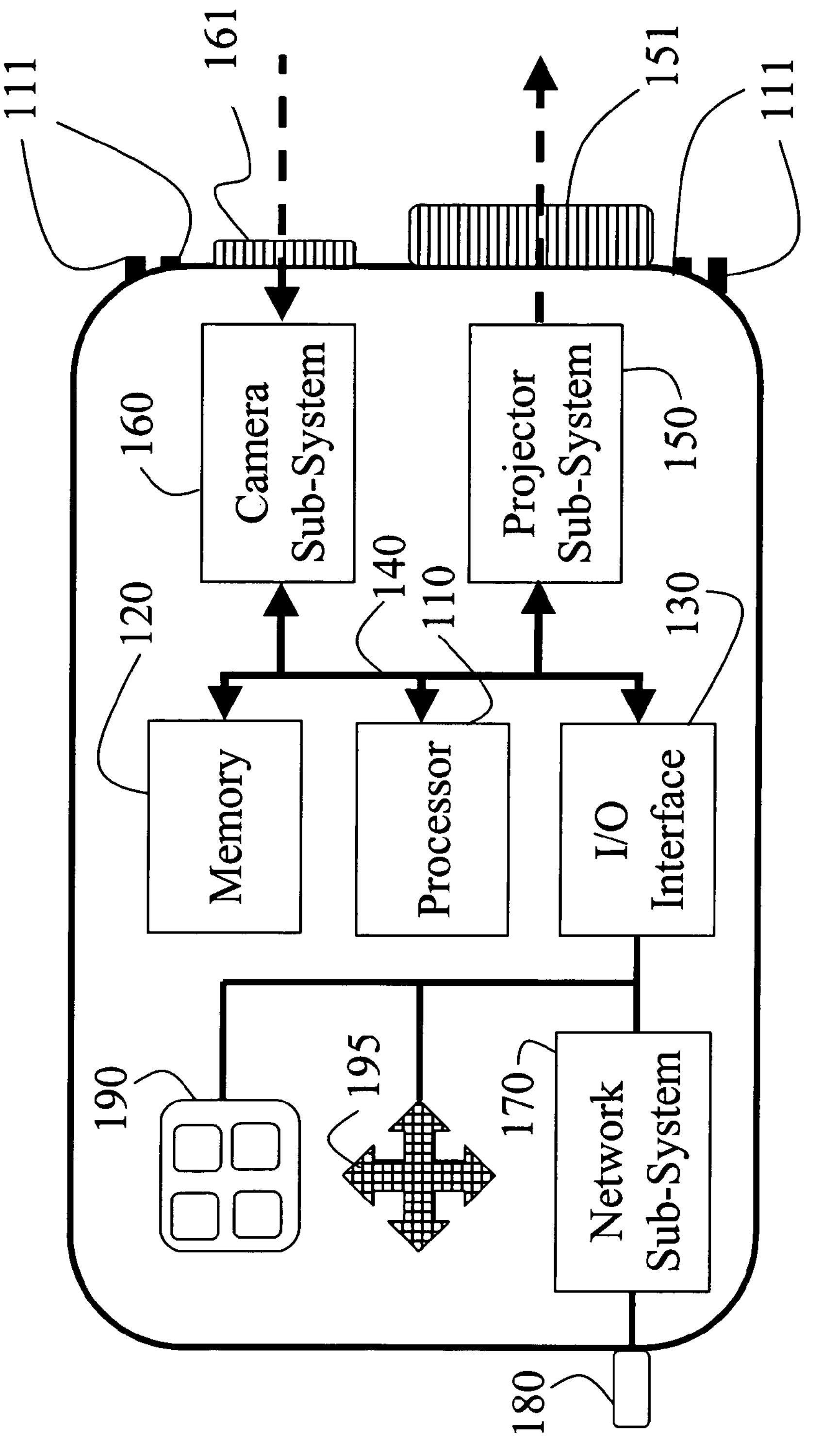
FIG. 1 is a block diagram of a projector-camera system according to the invention.

FIG. 1 shows a projector-camera system 100 according to our invention. It should be noted that the system 100 can be used in both front and rear projection modes, and alone or in a cooperative combination with other similar projectors.

Our system 100 includes a microprocessor 110, a memory 120, and an I/O interface 130 connected by buses 140, generally a processing unit. The processing unit is conventional in its electronic structure, but unconventional in its operation when performing the method steps described herein.

The system 100 also includes a projector sub-system 150 for displaying output images, and a camera sub-system 160 for acquiring input images. The projector sub-system 150 includes a projector lens 151 with a projector focal point 152, and the camera sub-system 160 includes a camera lens 161 and a camera focal point 162.

Figure 2:
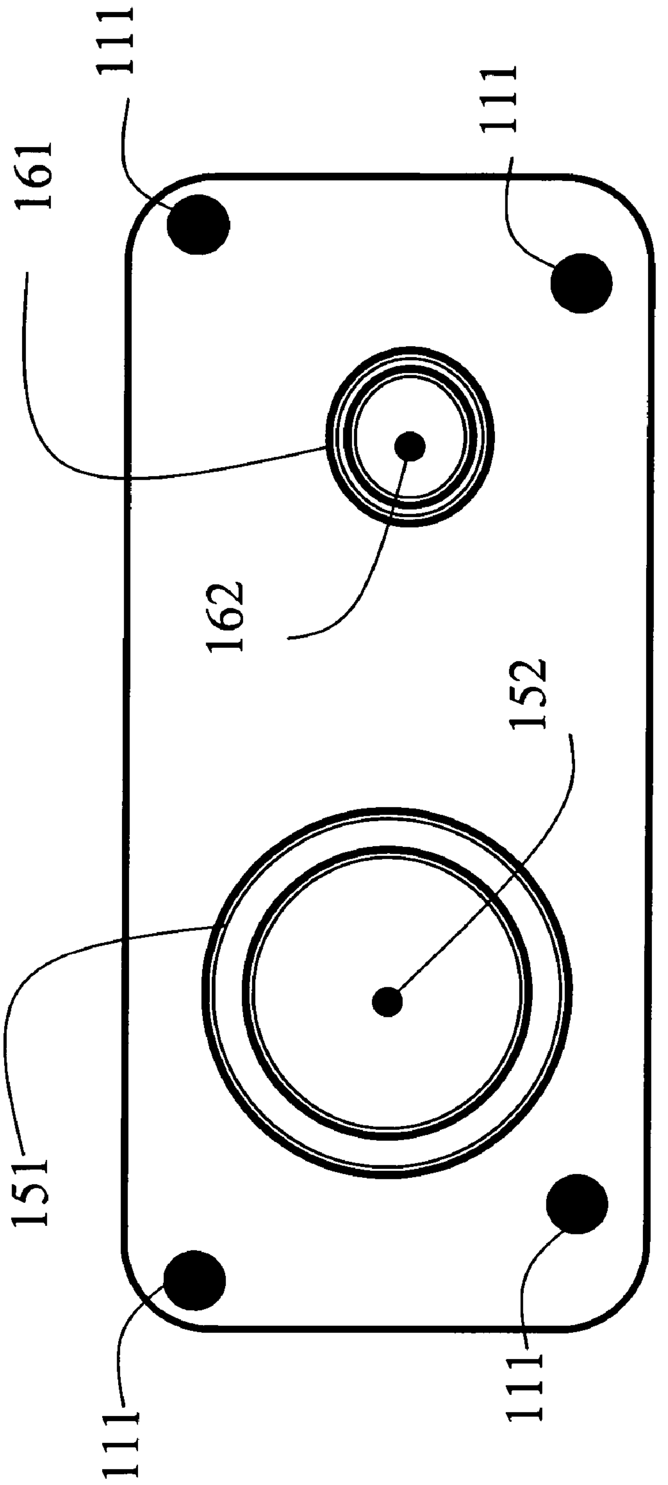
FIG. 2 is a front view of the system of FIG. 1.

As shown in FIG. 2, laser pointers 111, e.g., four, are also attached to the projector system 100. The laser pointers are directed onto the display surface in the same general area as the output images.

A network sub-system 170 allows the projector to communicate with other similar devices, or other computing devices, local or remote. Therefore, the network system can be connected to an antenna or infrared transceiver 180, depending on the communications medium. The network can be used to transmit content for display.

A user interface 190 can provide input and output data to facilitate operation of the system. Optional internal sensors 195, e.g., tilt sensors or accelerometers can determine an orientation of the projector with respect to the world. It should be noted that the sensors are internal only, and do not sense the environment external to the system.

Projector Operation

The projector-camera system 100 according to the invention can perform a number of functions, including smart keystone correction, orientation compensated image intensities, auto brightness, zoom and focus, 3D scanning for geometry and texture capture.

The system 100 can communicate with other devices and objects in a scene to 'learn' required geometric relationships. The ability to learn these relationships dynamically, as the system is operating, is in major contrast with prior art projectors that require a pre-configured geometric setup, complex calibration, communication and user assistance.

Optically, the rigidly-coupled projector-camera system 100 is conceptually identical to a pair of stereo cameras. In a sense, there are two pinhole devices beside each other. Because of this, stereo calibration techniques can be applied. In fact, the projector-camera system 100 is, in some ways, easier to calibrate. First, projectors usually have negligible radial distortion, so radial distortion can be ignored. Second, instead of needing to locate corresponding features in a pair of stereo images, the projector projects features at known locations, and the camera records these features. This makes it much easier to determine correspondences of the features. Stereo calibration is well known, see Faugeras, "*Three-dimensional computer vision*" MIT Press, 1993.

Figure 7:
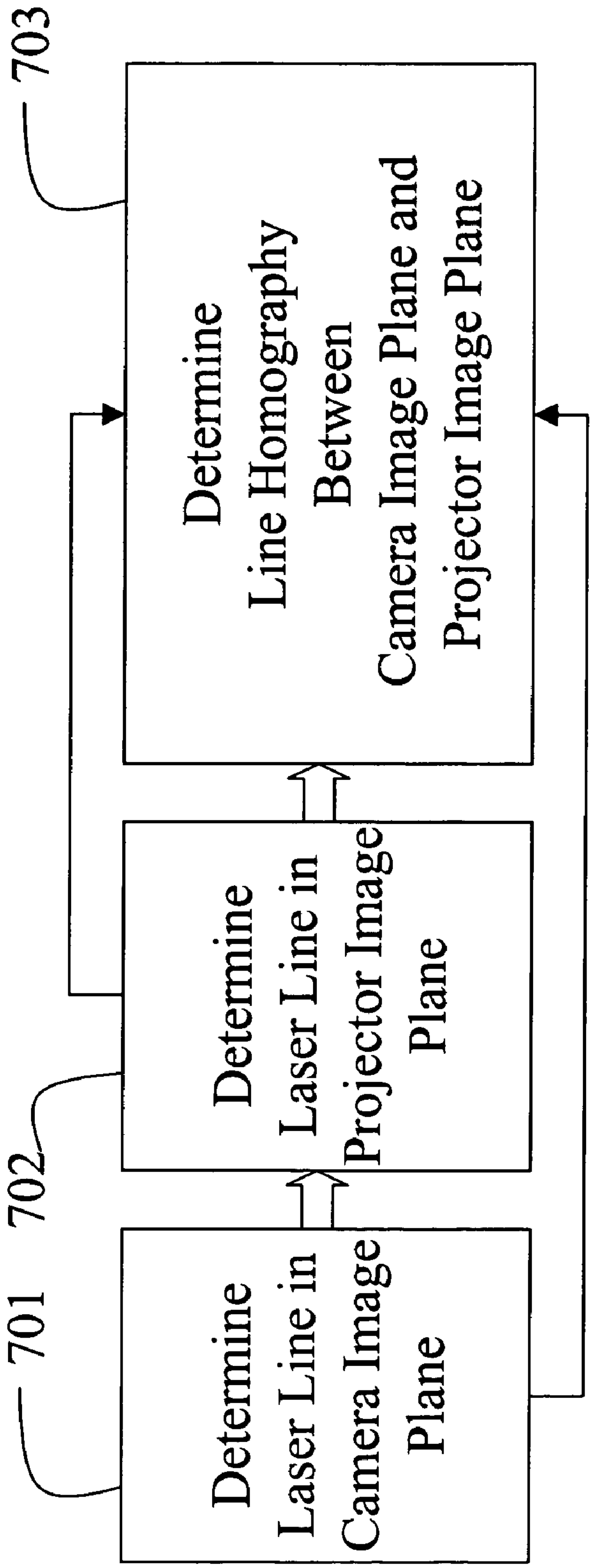
FIG. 7 is a flow diagram of a method according to the invention.

For reasons stated above, it is desired to calibrate the system 100 with the laser pointers 111. It should be understood that the laser pointers cannot be treated as pinhole devices. A method for calibrating the system is shown in FIG. 7.

Laser Line in Camera Image Plane

Figure 3:
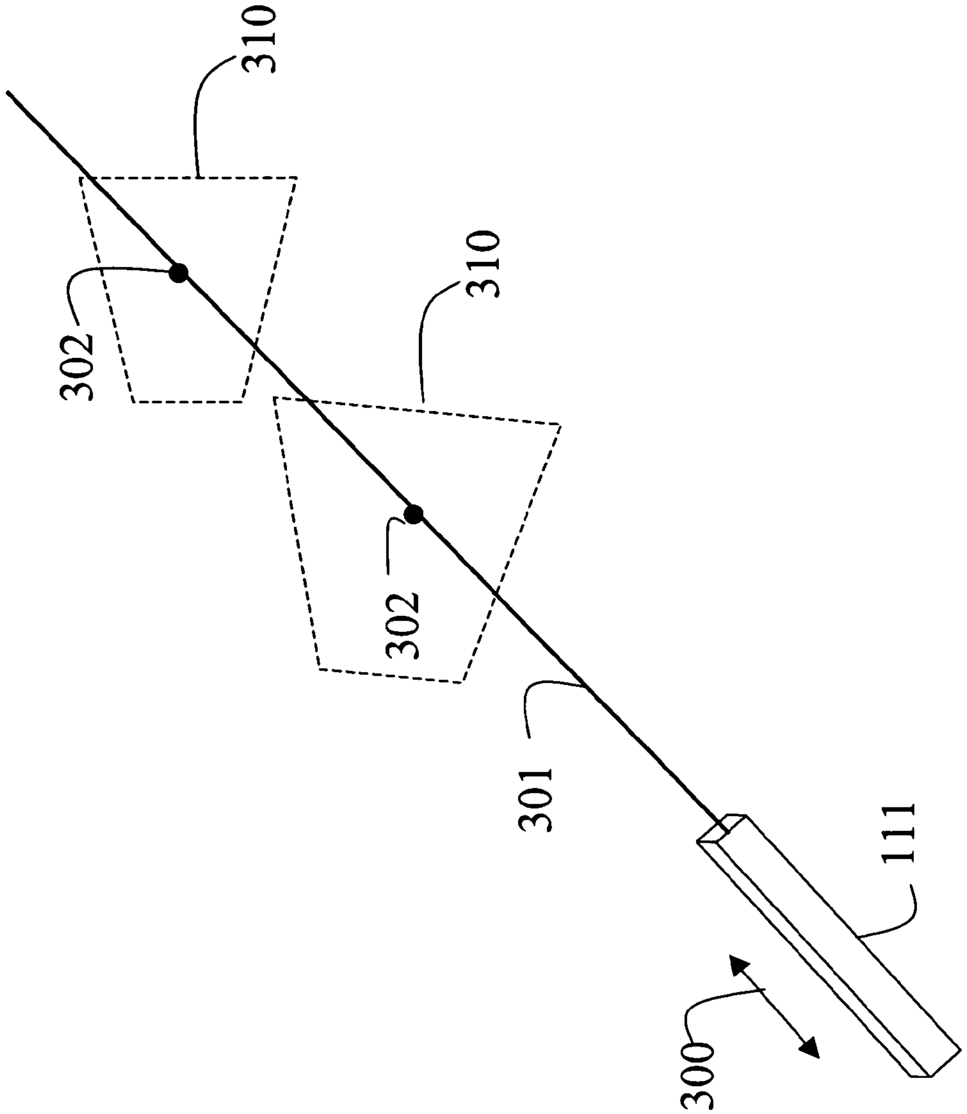
FIG. 3 is a schematic of a laser ray projected at surfaces at different distances.
Figure 4:
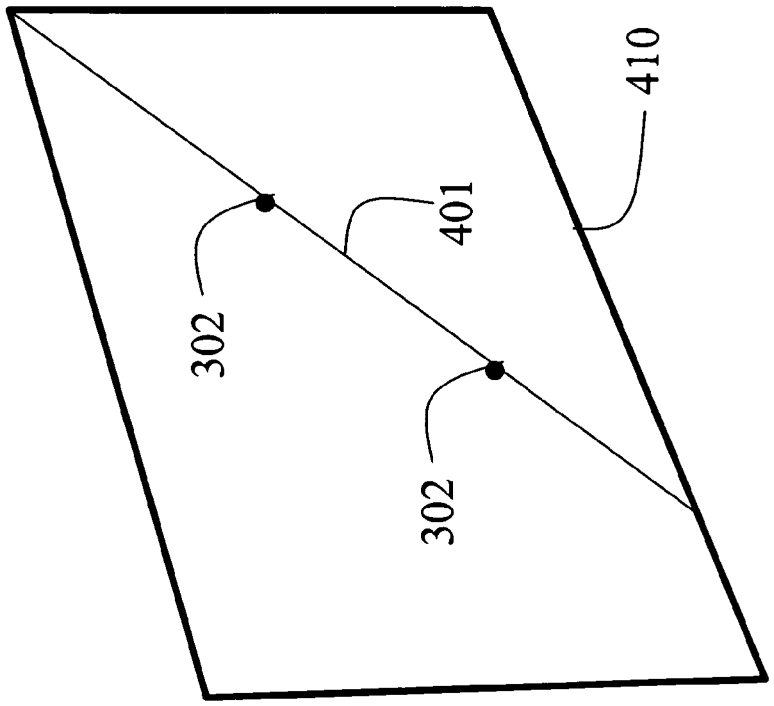
FIG. 4 is a schematic of a line through two laser points in a camera image.

As shown in FIGS. 3 and 4, we assume that each ray 301 of each pointer 111 originates at some arbitrary fixed location relative to the projector focal point 152 and the camera focal point 162. Depending on distances between the laser pointer 111 and a display surface 310, as the system 100 moves 300, a laser point 302 projects to a laser line 401 on a camera image plane 410. The location of the line 401 is fixed because the laser pointer is in a fixed relationship relative to the camera.

The location of the line 401 on the camera image plane is determined 701 by projecting the laser pointer onto the display surface, then acquiring a camera image $p_c$ for the laser point. This is step is performed with the laser pointer at two or more different distances from the display surfaces to acquire a set of camera image points $p_{ci}$, for i=1, . . . , n. Then, locate 701 the line $l_c$ through the points $p_{ci}$.

Laser Line in Projector Image Plane

The ray 301 also projects onto a line on an image plane of the projector. The location of this line can be determined 702 by projecting four points $x_{pi}$, i=1, . . . , 4 from the projector onto the display surface, while concurrently projecting the laser pointer onto the display surface. Acquire the corresponding camera image points $x_{ci}$, i=1, . . . , 4, and the laser points $p_c$. Then, determine a camera-projector homography $H_{cp}$ using the correspondences ($x_{ci}$, $x_{pi}$). Determine a point $p_p=H_{cp}p_c$. The point $p_p$ is the projection of the laser point onto the projector image plane. This step is performed with the display surface at two or more different distances, to record a set of projector points $p_{pi}$, i=1, . . . , n. Then, locate the line $l_p$ through the points $p_{pi}$.

Now, the problem is reduced to two pinhole devices effectively observing a line in space. Just as two pinhole devices observing a plane are related by a point homography, two pinhole devices observing a line are related by a line homography.

Figure 5:
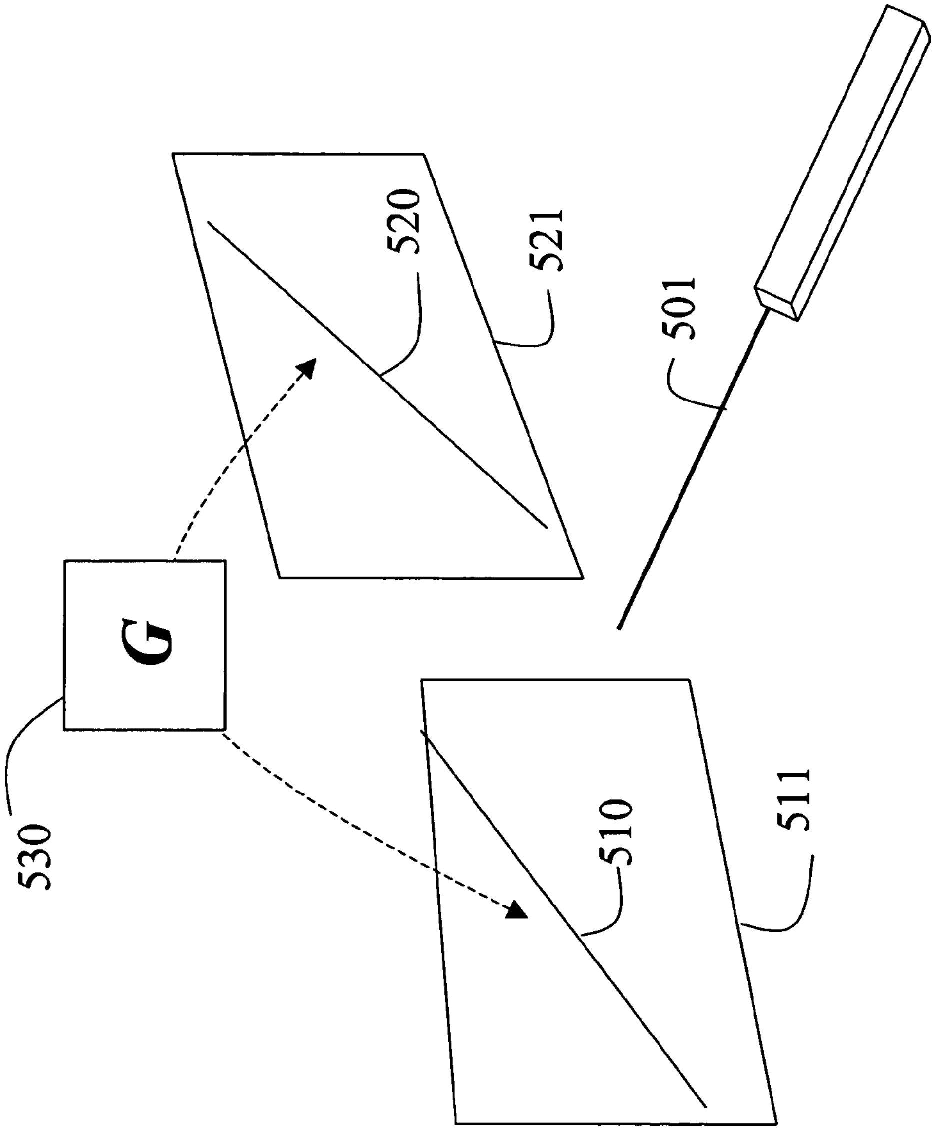
FIG. 5 is a schematic of a line homography according to the invention in a projector image and a camera image.

As shown in FIG. 5, the projection of the laser ray is determined by a line $l_c$ 510 on the projector image plane 511 and a line $l_p$ 520 on the camera image plane 521. A line homography G 530 describes the transformation of points between the two lines 510 and 520.

Line Homography

Figure 8:
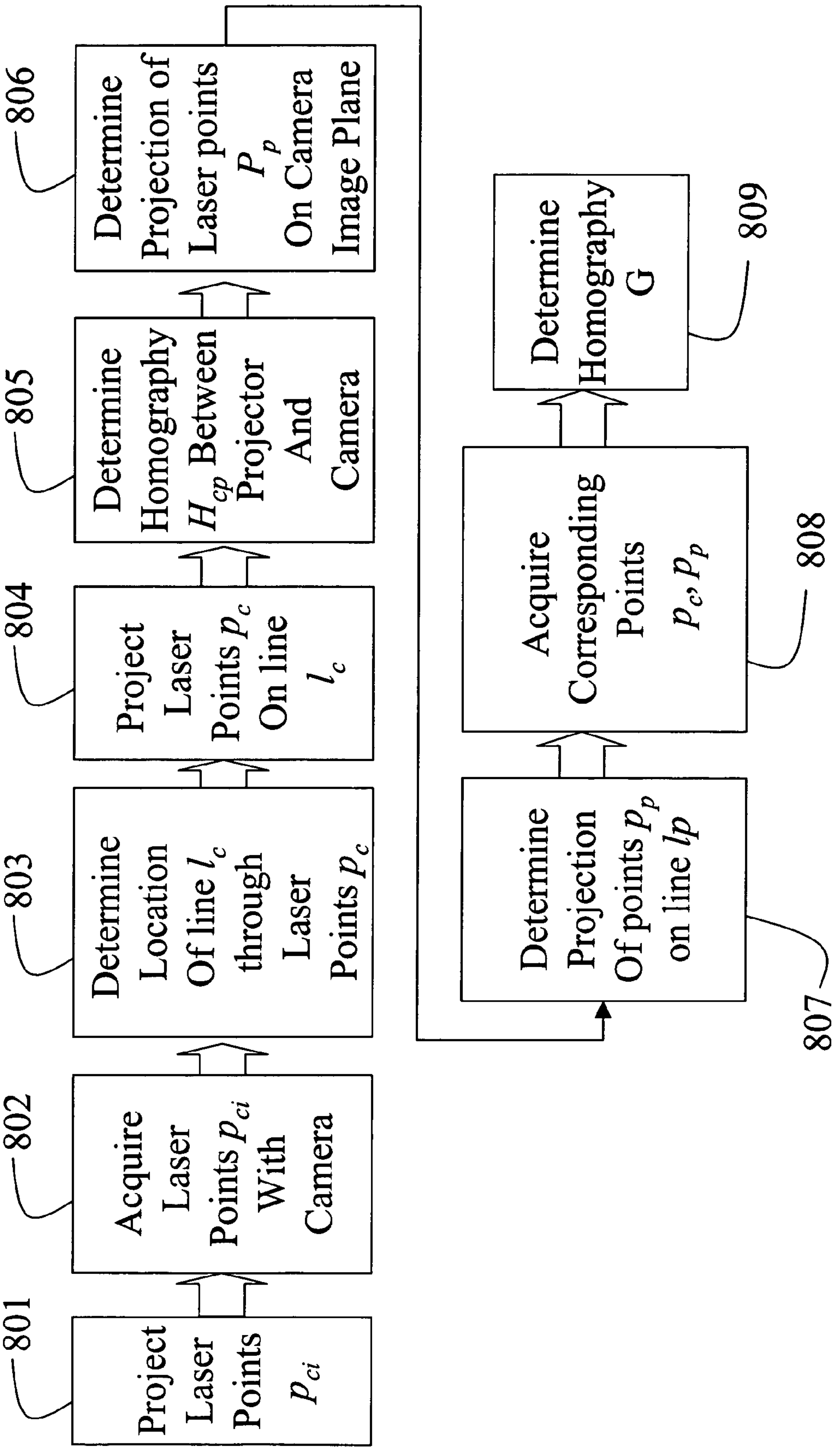
FIG. 8 is flow diagram of detailed steps of the method of FIG. 7.

As shown in greater detail in FIG. 8, the line homography G is determined 703 by projecting 801 laser points $p_c$ with the laser pointers onto the display surface. Acquiring 802 the corresponding camera image point $p_c$ for the laser points.

Determine 803 location of line $l_c$. Project 804 each laser point $p_c$ to a point $p_{c1d}$ on the line $l_c$, where $p_{c1D}$ is expressed in a one-dimensional (1D) coordinate frame on the line.

Follow the steps above to determine 805 the homography $H_{cp}$ and thereby determine 806 $p_p$, i.e., the projection of each laser point on the projector image plane. Project 807 the point $p_p$ to a point $p_{p1D}$ on the line $l_p$, where $p_{piD}$ is also expressed in a 1D coordinate frame on the line. This step is performed for four or more different distances between the laser pointers and the display surface, to acquire 808 a set of corresponding points $p_{ciD}$, $p_{piD}$, i=1, . . . , n. Use the correspondences to determine 809 a line homography G between the two lines 510 and 520. These steps can be repeated for each laser pointer 111.

Given the line homography G, for any camera observation $x_{c1d}$ of the laser point on the display surface, it is possible to determine $x_{p1d}=Gx_{c1d}$, i.e., the projection of the laser point on the projector image plane using conventional techniques.

Thus, the laser point observations, i.e., the laser line, can be transformed so that they effectively arise via a pinhole projection from the projector. We use this information as input to prior art calibration methods for projector-camera system, which are based on two rigidly-attached pinhole devices.

The main motivation for augmenting the projector-camera with laser pointers according to the invention is to avoid constraints on the projected images, and to provide laser spots on the display surface that are easily detected by the camera. However there are additional advantages to using laser pointers.

If multiple projector-camera systems are used, each system can have a set of laser pointers that have different colors, i.e., red, blue, green, etc. This enables image discrimination when multiple projectors project onto a shared display surface.

Infra-red laser pointers can be used to provide projected points that are visible to the camera but invisible to a user, and hence are unobtrusive.

Figure 6:
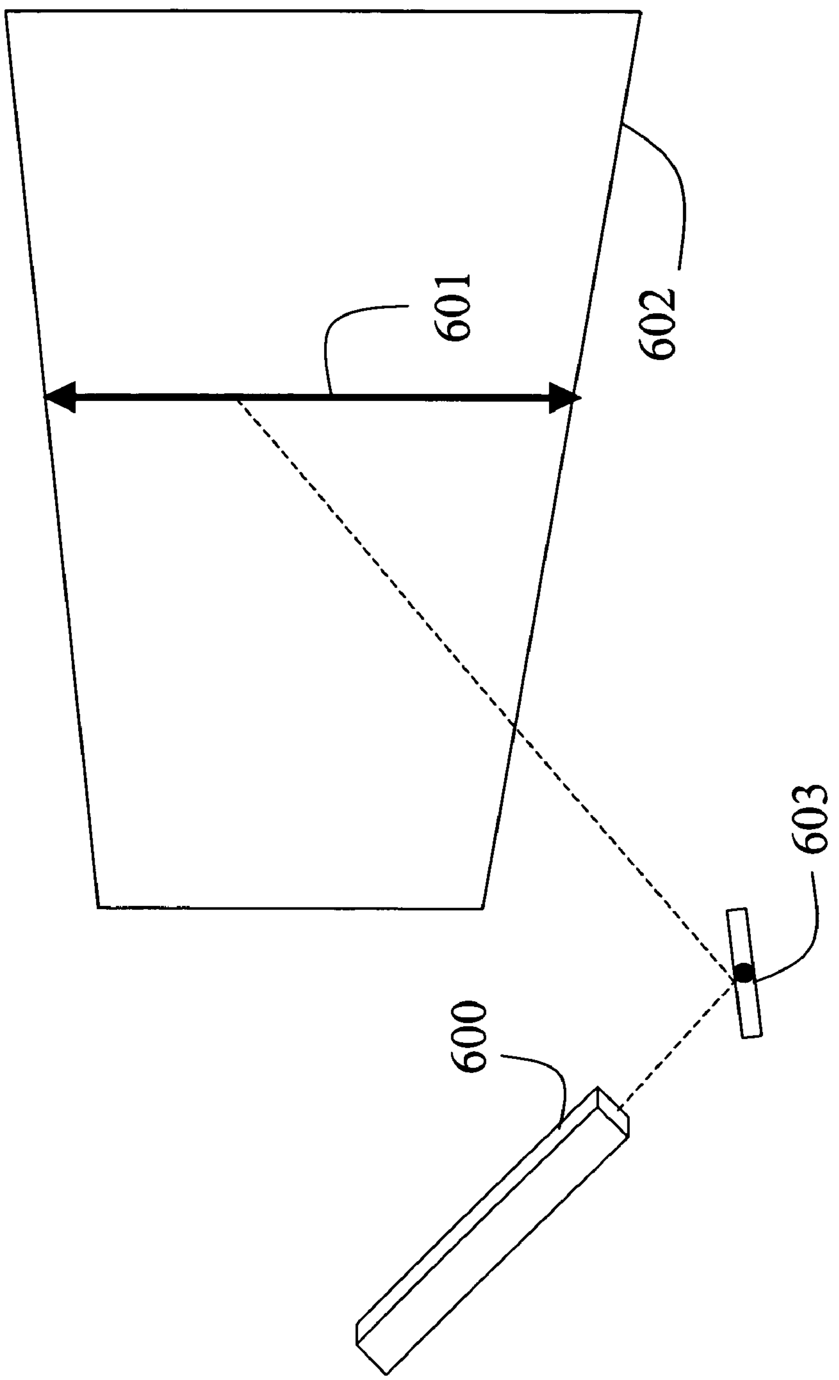
FIG. 6 is a block diagram of a laser pointer drawing a vertical line.

As shown in FIG. 6, a laser pointer 600 can also 'draw' a vertical line 601 on a display surface 602 using the sensor 195, and pivoting mirror 603. This is useful to correctly align the projected images with the world vertical when the projector-camera system 100 is rotated.

Effect of the Invention

A projector-camera system determines the homography induced by a display surface between camera and projector using laser pointers rigidly fixed to the system. Although, in some sense, the laser pointers are redundant, it is more practical to detect laser points on the display surface with unconstrained images.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for determining a projector pixel that is related by pinhole projection to a laser point on a display surface, comprising:

projecting a laser point onto a display surface with a laser pointer;

viewing the laser point with a camera in a fixed relationship with respect to the laser pointer and with respect to a projector, in which the laser pointer and the camera are mounted rigidly on the projector;

projecting a set of projector points onto the display surface with the projector;

viewing the set of projector points with the camera;

determining a planar homography between the camera and projector defined by a correspondence between the projector points in a projector image plane and the projector points in a camera image plane;

using the planar homography to transform the laser point from the camera image plane to the projector image plane as transformed laser points;

determining a location of a first line in the camera image plane passing through the set of laser points acquired as a distance varies between the laser pointer and the display surface;

determining a location of a second line in the projector image plane passing through the set of transformed laser points acquired as the distance varies between the laser pointer and the display surface;

determining a line homography between the first line and the second line using the laser points and the corresponding transformed laser points; viewing a subsequent laser point with the camera, and using the line homography to transform the subsequent laser point to the projector image plane to determine a location of a pixel on the projector image plane related by pinhole projection to the subsequent laser point on the display surface, in which the pixels are set to give a fixed projection on the display surface while the projector is moving.

2. The method of claim 1, in which four or more laser points from four or more laser pointers are viewed by the camera, and the transformed points on the projector image plane are determined by each of four or more line homographies determined for the four or more laser points, and the four or more laser points and corresponding transformed four or more laser points are used to determine a planar homography between the camera and projector.

3. The method of claim 2, in which the camera detects four fixed physical points on the display surface, and uses the planar homography to transform the physical points to the projector image plane, and uses the transformed points to define a coordinate frame on the projector image plane, and sets the value of other pixels on the projector image plane relative to the coordinate frame, so that a projection on the display surface by the projector is in correspondence to the physical points as the pixels are in correspondence with the coordinate frame.

* * * * *